United States Patent [19]
Moeller

[11] 3,811,411
[45] May 21, 1974

[54] METHOD OF CULTIVATING MOLLUSKS
[76] Inventor: Henry W. Moeller, 45 St. Andrews Rd., South Hampton, N.Y. 11968
[22] Filed: Jan. 2, 1973
[21] Appl. No.: 320,656

[52] U.S. Cl. .................................................. 119/4
[51] Int. Cl. ............................................ A01k 61/00
[58] Field of Search ................................... 119/4, 2

[56] References Cited
UNITED STATES PATENTS
3,702,599  11/1972  Herolzer ............................... 119/4
2,853,049  9/1958  Glancy .................................. 119/4
3,701,338  10/1972  McMillin .............................. 119/4

Primary Examiner—Hugh R. Chamblee
Attorney, Agent, or Firm—Pennie & Edmonds

[57]  ABSTRACT

Mollusks are cultivated by enclosing discrete groups of seed mollusks lengthwise of the interior of the tube of netting material, lowering the resulting tube into an aqueous mollusk growth-inducing environment, and thereafter harvesting the grown mollusks.

6 Claims, 5 Drawing Figures

METHOD OF CULTIVATING MOLLUSKS

This invention relates to mariculture and, more particularly, to the cultivation of mollusks.

In the cultivation of mollusks such as clams, mussels and oysters, it is desirable to have positive control over their positioning and location not only to promote their growth but also to effect their harvest. In the case of oysters, for example, it is desirable in the early stage of their development to maintain them above the bottom of the body of water to avoid their predators such as drills and starfish but it is also desirable after they have obtained an adequate stage of growth to lower them to the bottom or to transport them to another location where they fatten in the more saline water. In the case of clams, on the other hand, it is desirable from the early stage of their development to embed them in a sandy bottom from which they can ultimately be recovered for harvesting.

I have now devised a method of cultivating mollusks which meets all of the needs and requirements of the modern concepts of mariculture. Pursuant to the invention, a predetermined quantity of seed mollusks is charged to the interior of a tube of expansible netting material, the tube is substantially closed in back of said charge, the aforesaid charging and closing operatings are repeated until the tube has been filled with a multiplicity of longitudinally spaced quantities of the mollusks, and thereafter the thus-filled tube is placed in an aqueous environment conducive to the cultivation of the mollusks.

These and other novel features of the method of the invention will be more readily apparent from the following description taken in conjunction with the accompanying drawing in which FIG. 1 is a view of a fragment of netting useful in practicing the invention;

The seed mollusks which can be cultivated by the method of the invention include not only those conventionally defined as such but also include seed-bearing parent mollusks. In general, the small seed mollusks are about one-half to one inch in average diameter and require a mesh size in the tubular expansible nettin material sufficiently small to retain this seed stock.

Figure 1:
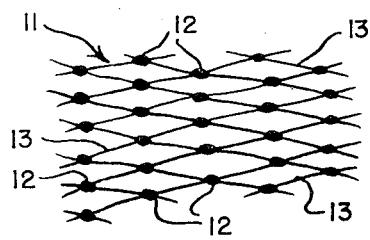
Figure 2:
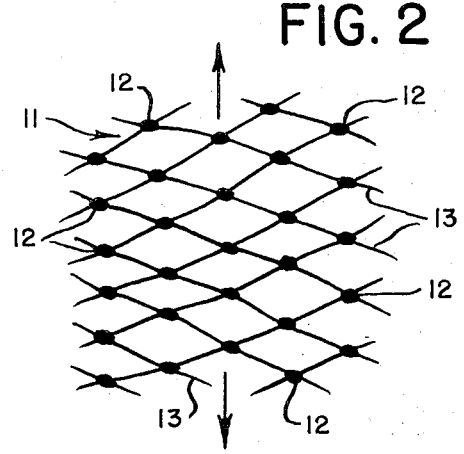
FIG. 2 is a view of the netting of FIG. 1 in expanded form.

The expansible netting material used to contain the seed mollusks can be composed of any material capable of resisting destructive corrosion in the aqueous medium in which the mollusks are cultivated. Thus, the mesh netting can be made of metal wire such as stainless steel, cellulosic material such as fish net, cotton cord or cellulose acetate, or polymeric plastic such as polyvinyl chloride, nylon, polyester, and the like. The mesh construction, in each case, need only be such as to impart expansibility to the structure so that a measured quantity of seed mollusks initially charged to a section of a tube formed of the mesh material can expand to accommodate the increased size of the mollusk during its cultivation. For example, I have found that the plastic netting 11 produced and sold by E.I. duPont deNemours & Co. under their trade name Vexar, and having the construction shown in FIG. 1, is particularly suitable for use in practicing the invention because the longitudinal spacing of the junction 12 of the netting filaments 13 is capable of being converted to transverse spacing as shown in FIG. 2 when an expanding force is applied to the netting as indicated by the arrows.

Figure 3:
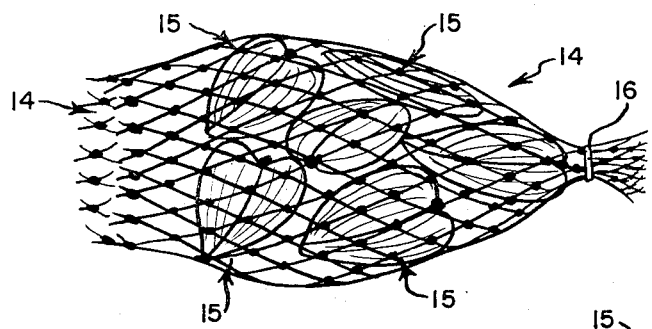
FIG. 3 is a side view of a tube of netting containing a charge of seed mollusks pursuant to the invention.
Figure 4:
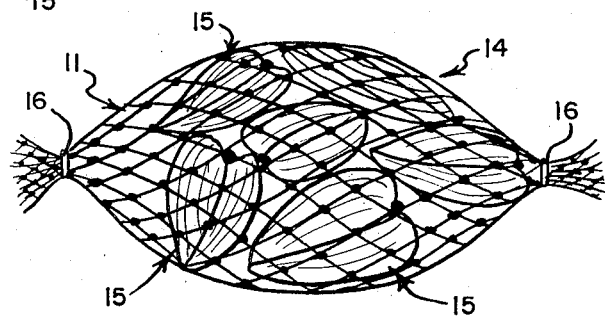
FIG. 4 is a side view of the charged tube of FIG. 3 with the tube closed adjacent the charge.

The expansible netting material is used in tubular form in practicing the method of the invention. A measured quantity of seed mollusks is charged into an open end of such a tube 14 to form a localized mass of the mollusks 15 but without causing significant expansion of the netting as shown in FIG. 3. After this mass of seed mollusks has been formed in the tube, the tube is closed behind the mass in any appropriate manner. In the preferred practice of the invention, the tube can be closed by a conventional plastic strap fastener 16, or by an encircling cord or the like, as shown in FIG. 3. This procedure is then repeated so as to form a multiplicity of longitudinally spaced quantities or masses of the seed mollusks 15 throughout the length of the tube.

The thus-filled tube of expansible netting material containing separated masses or colonies of seed mollusks is then ready for placing in an aqueous environment conducive to cultivation of the mollusks. In the case of seed oysters, the tube of colonies is suspended above the bottom of a body of water of suitable salinity for development of the oysters. By maintaining the oysters above the bottom of the body of water they are kept out of the environment normally inhabited by drills and starfish, which are natural enemies of the seed oysters, until the oysters have reached maturity. The tube of mature oysters can then be lowered to the bottom of the body of water, or moved to another location, where the salinity is greater and promotes fattening of the oysters immediately prior to their being harvested. To harvest the oysters, the tube is raised out of the water and the tube is cut open, if of expendible material, or the barriers are removed from a tube to be saved, so that the oysters can be withdrawn from the tube prior to reuse of the tube in repeating the cultivation method of the invention. In the case of clams on the other hand, the tube filled with seed clams is advantageously submerged under the surface of a sandy bottom of a body of water to cultivate them in thier natural aqueous environment.

Figure 5:
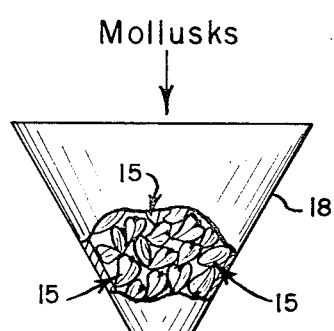
FIG. 5 is a side view of apparatus used to charge a tube of netting material with seed mollusks pursuant to the method of the invention.
Figure 5:
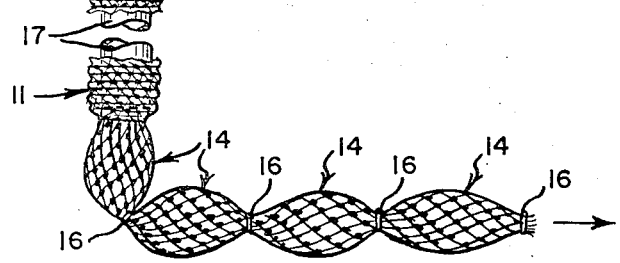

The following specific example is illustrative but not limitative of the practice of the invention:

A length of tubular plastic netting available on the market as duPont's Vexar brand plastic netting 11 is pushed onto the outside of one end of a metal tube 17 provided at its other end with a funnel-like mouth 18, as shown in FIG. 5. About 1,000 linear feet of such netting can be pushed and applied onto 20 feet of the metal tube. The mesh size of the netting 11, about one-half inch square when fully expanded, is sufficiently small to contain seed clams having a width of about five-eighths inch, and the diameter of the tube 14 is great enough to feed the seed clams into the surrounding netting. A charge of the seed clams 15 is fed through the funnel end of the metal tube and into the netting tube against its closed end which is secured by injecting a conventional plastic fastener around or through the meshes or by weaving a piece of cotton cord through the meshes and by then pulling the cord taught. The mass of seed clams thus charged to the netting tube has a diameter of approximately 2 to 6 inches and is held in place by closing the netting tube again with a plastic fastener or the like. This procedure is repeated until the full length of the netting tube is charged with spaced predetermined quantities of seed clams. The thus-filled netting tube is then lowered onto the sandy bottom of a body of salt water and is buried beneath the surface of the sand by jetting a blast of water or air, supplied by a conventional jetting hose or the like, around the netting tube. After an appropriate cultivation period of from a few weeks to 2 years, depending upon the degree of cultivation desired, the netting tube is raised from the water whereupon the tube can be cut readily to harvest the clams.

I claim:

1. The method of cultivating mollusks which comprises charging a predetermined quantity of seed mollusks to the interior of a tube of expansible netting material, substantially closing the tube in back of said charge, repeating the aforesaid charging and closing operations until the tube has been filled with a multiplicity of longitudinally spaced quantities of the mollusks, and thereafter placing the thus-filled tube in an aqueous environment conducive to the cultivation of the mollusks.

2. The method according to claim 1 wherein the mollusks are clams, and the tube filled with spaced quantities of the clams is embedded beneath the surface of a sandy bottom of a body of water.

3. The method according to claim 1 wherein the mollusks are oysters, and the tube filled with spaced quantities of the oysters is supported above the bottom of a body of water for at least a portion of the cultivation period of the oysters.

4. The method according to claim 1 wherein the tube is removably closed around each spaced charge of seed mollusks.

5. A method for cultivating mollusks comprising the steps of:
   a. pushing a length of expansible netting material around a charging tube;
   b. discharging a pre-determined quantity of seed mollusks to the interior of said charging tube;
   c. receiving said pre-determined quantity of seed mollusks in said tube of expansible netting material;
   d. substantially closing the tube in back of said charge;
   e. advancing said tube of expansible netting material from said charging tube;
   f. repeating the aforesaid charging and closing operations until the tube has been filled with a multiplicity of longitudinally spaced quantities of mollusks; and
   g. placing the thus-filled tube in an aqueous environment conducive to the cultivation of the mollusks.

6. The method of cultivating mollusks which comprises discharging pre-determined quantities of seed mollusks to the interior of a tube of material at spaced locations with each quantity being isolated from adjacent quantities, and thereafter placing the thus-filled tube in an aqueous environment conducive to the cultivation of the mollusks.

* * * * *